(12) United States Patent
Jolly

(10) Patent No.: US 7,501,575 B2
(45) Date of Patent: Mar. 10, 2009

(54) SNAP FIT SCREW PLUG

(75) Inventor: Robert K. Jolly, Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 11/893,931

(22) Filed: Aug. 17, 2007

(65) Prior Publication Data
US 2008/0179071 A1 Jul. 31, 2008

Related U.S. Application Data

(60) Provisional application No. 60/898,295, filed on Jan. 30, 2007.

(51) Int. Cl.
H02G 3/08 (2006.01)
(52) U.S. Cl. .................. 174/50; 174/53; 174/54; 174/58; 220/3.3; 40/570; 361/704; 439/535
(58) Field of Classification Search ............ 174/50, 174/53, 54, 55–58, 64; 220/3.2, 3.3, 3.4, 220/3.8, 3.94; 40/570, 580; 362/20, 183; 99/453; 361/704, 719; 439/535; 248/906
See application file for complete search history.

(56) References Cited

U.S. PATENT DOCUMENTS

| 4,265,365 | A | * | 5/1981 | Boteler .................. 220/3.3 |
| 4,754,247 | A | | 6/1988 | Raymont et al. |
| 4,988,832 | A | | 1/1991 | Shotey |
| 5,171,939 | A | | 12/1992 | Shotey |
| 5,257,946 | A | | 11/1993 | MacMillan et al. |
| 5,470,184 | A | | 11/1995 | Chandler |
| 5,768,814 | A | * | 6/1998 | Kozek et al. ............ 40/570 |
| 6,213,007 | B1 | * | 4/2001 | Lande .................. 99/453 |
| 6,435,903 | B1 | | 8/2002 | Nelson |
| 6,530,806 | B2 | | 3/2003 | Nelson |
| 6,737,576 | B1 | | 5/2004 | Dinh |
| 6,859,368 | B2 | * | 2/2005 | Yang .................. 361/704 |

* cited by examiner

Primary Examiner—Dhiru R Patel
(74) Attorney, Agent, or Firm—Hoffmann & Baron, LLP

(57) ABSTRACT

An electrical outlet box includes fastening hardware to secure the box to a wall structure. A cover overlies the fastening hardware. The box has a flange with mounting apertures therethrough to receive the fastening hardware. The apertures may be formed in a recess in the flange. The cover may be formed as a plug that is inserted into the recess to provide a flush surface with said flange.

14 Claims, 4 Drawing Sheets

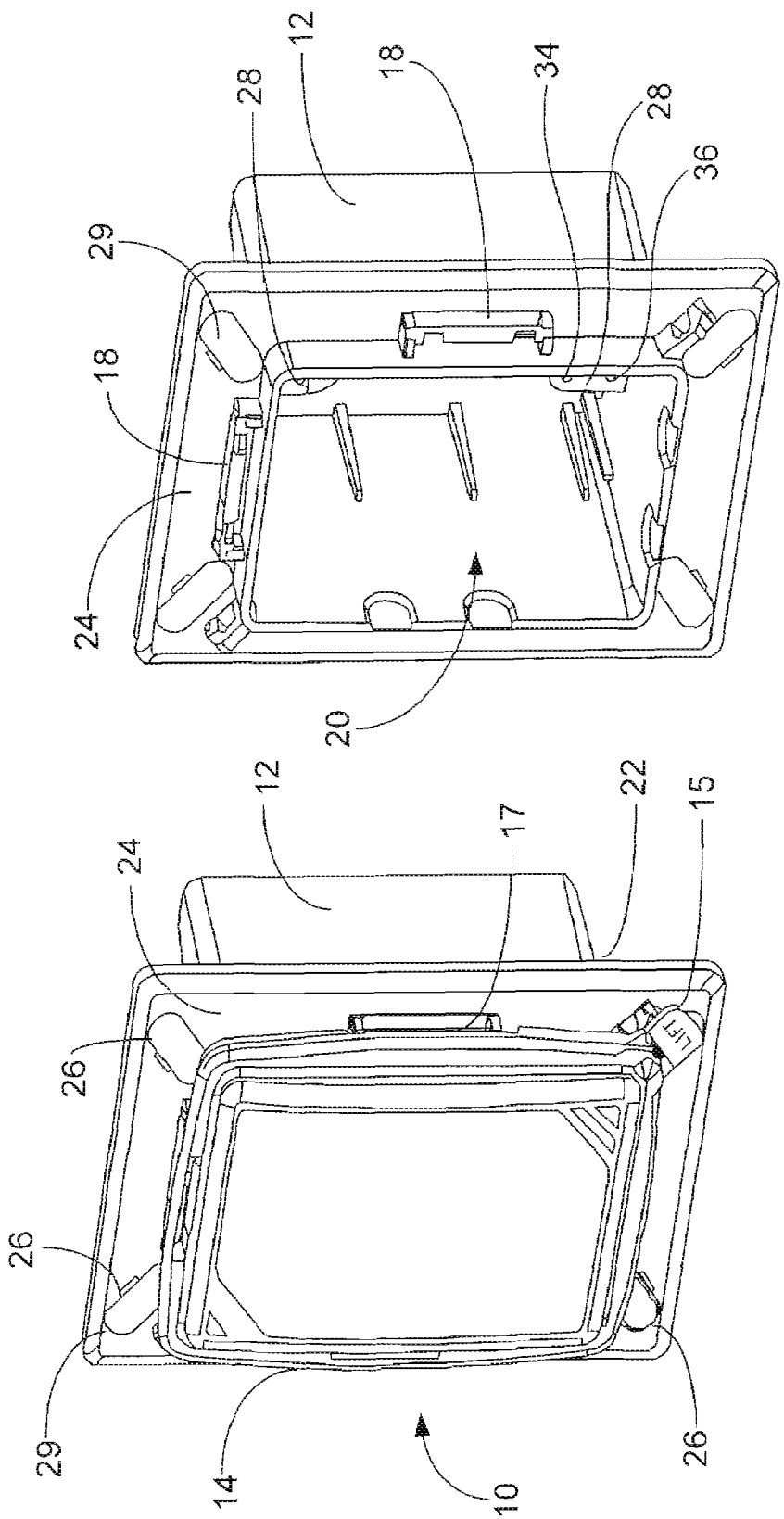

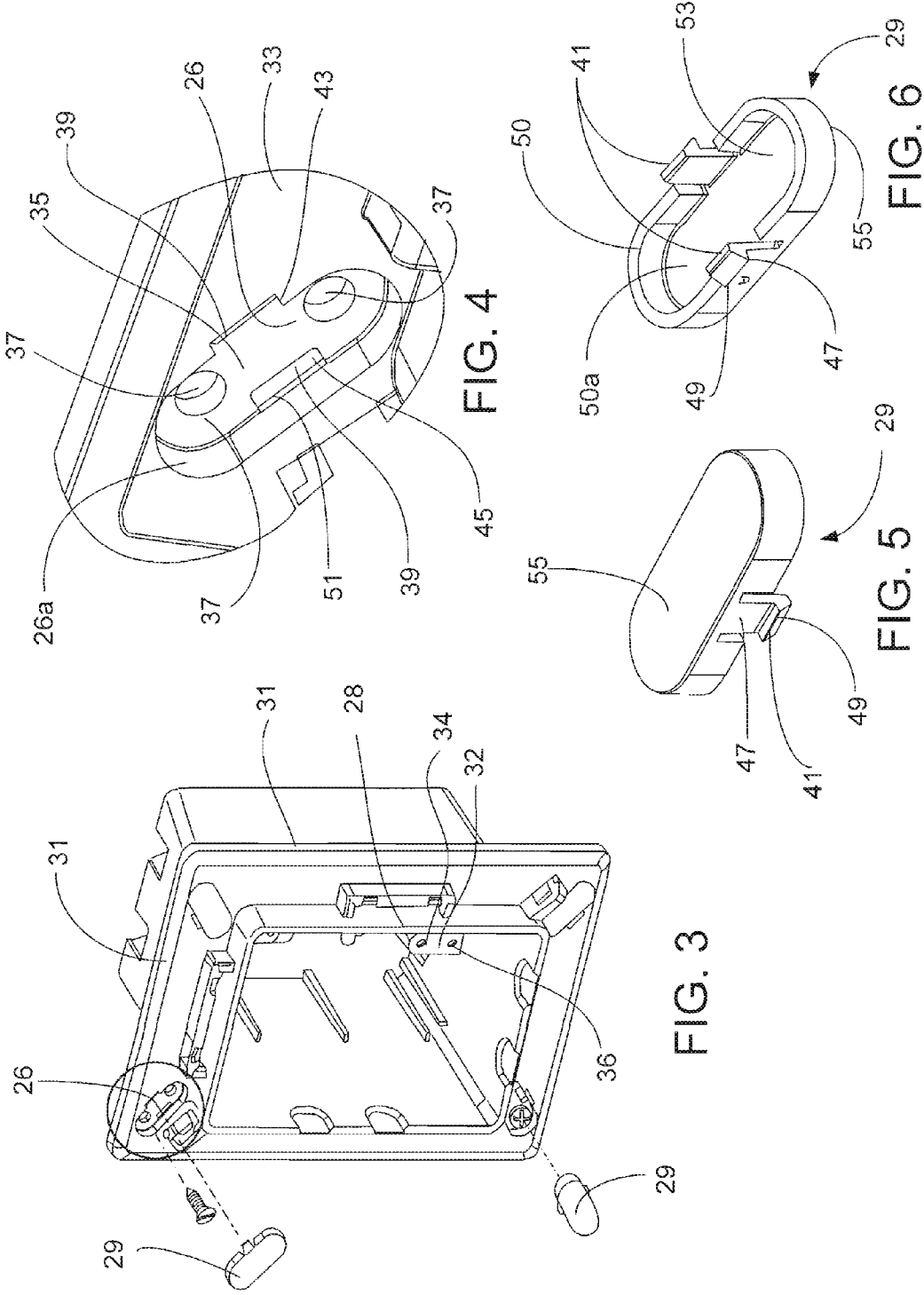

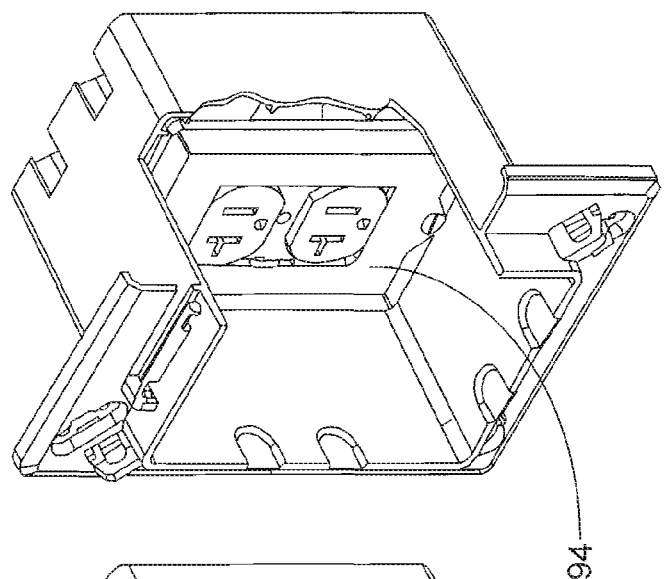
FIG. 10
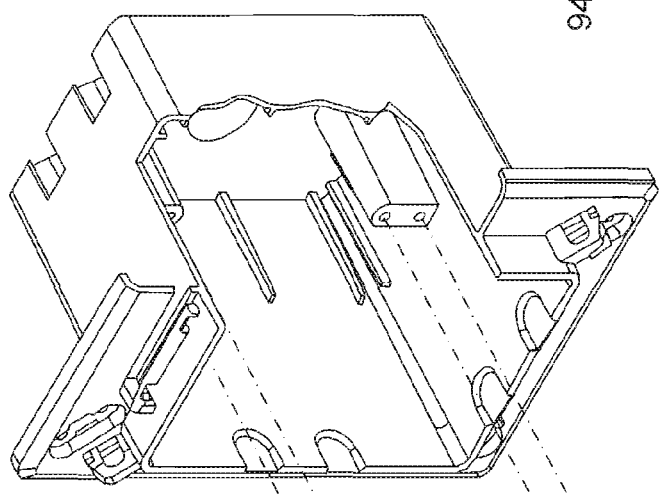
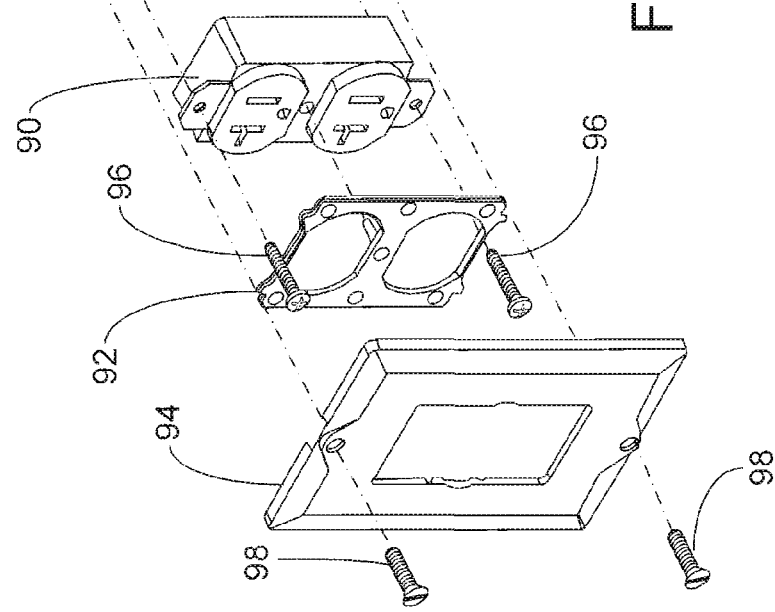
FIG. 9

SNAP FIT SCREW PLUG

CROSS-REFERENCE TO RELATED APPLICATION

This application claims the benefit of U.S. Provisional Application No. 60/898,295, filed Jan. 30, 2007, the entire contents of which are incorporated by reference herein.

FIELD OF THE INVENTION

This invention pertains to a snap fit screw plug or screw cover for covering the screw head and more particularly to a snap fit screw plug or screw cover for use with a recessed electrical outlet box such as a while-in-use box.

BACKGROUND OF THE INVENTION

Recessed electrical boxes are well-known. Such boxes are designed to be recessed in an opening in a wall or other building structure such that an actual electrical fixture (duplex, GFCI (Ground Fault Circuit Interrupter), switch, data jack, co-axial cable connector, etc.) is recessed into the wall and is not flush therewith as is normally the case.

Some recessed electrical boxes incorporate a cover thereon as shown in U.S. Pat. Nos. 4,988,832 and 5,171,939. Other such boxes include slots in the cover or the frame that permit a wire or cord to pass out of the box even when the cover is closed, see for example U.S. Pat. Nos. 5,257,946 and 6,737,576. While these and other recessed box designs are suitable for their intended purpose and provide a installation alternative for the user, due to their design, the screw heads used to affix the box to a structure are typically located on a flange that extends outwardly on the exterior of the box side wall. In order to mount the box to a structure, mounting screws are typically used which are received by mounting screw holes located on the flange. However because of the box design, the mounting screw heads are exposed and visible on the exterior of the box. The exposed screw heads do not provide a smooth appearance and may collect contaminants.

SUMMARY OF THE INVENTION

An electrical outlet box supports an electrical fixture. The box includes a box housing having a back wall, perimetrical side wall, and an open front face and a generally planar flange surrounding the open front face. The flange includes a mounting aperture threaded for receiving fastening hardware for securing the flange to a wall surface. A cover is positioned to overlie the mounting hardware and provide a flush relationship with said flange.

In a preferred embodiment, the aperture is surrounded by a recess. The cover includes a plug which is insertable into the recess. The plug may be tethered to the flange.

BRIEF DESCRIPTION OF THE DRAWINGS

FIG. 1 is a front perspective view of a while in use recessed electrical box with a cover installed having snap fit screw plugs installed;

FIG. 2 is a front perspective view of a while in use recessed electrical box having snap fit screw plugs installed;

FIG. 3 is a front perspective exploded view of a while in use recessed electrical box showing both a mounting screw and snap fit plug;

FIG. 4 is a recessed box mounting screw flange detail view showing a recessed area for mounting screws and snap fit screw plug;

FIG. 5 is a top perspective view of the snap fit screw plug of the present invention;

FIG. 6 is a bottom perspective view of the snap fit screw plug of the present invention;

FIG. 9 is an exploded front perspective view of a while in use recessed electrical box and electrical components showing a recessed area for mounting screws and snap fit screw plug; and FIG. 10 is a front perspective view of a while in use recessed electrical box and installed electrical components showing a recessed area for mounting screws and snap fit screw plug.

DETAILED DESCRIPTION OF THE PREFERRED EMBODIMENT

Figures 7, 8:
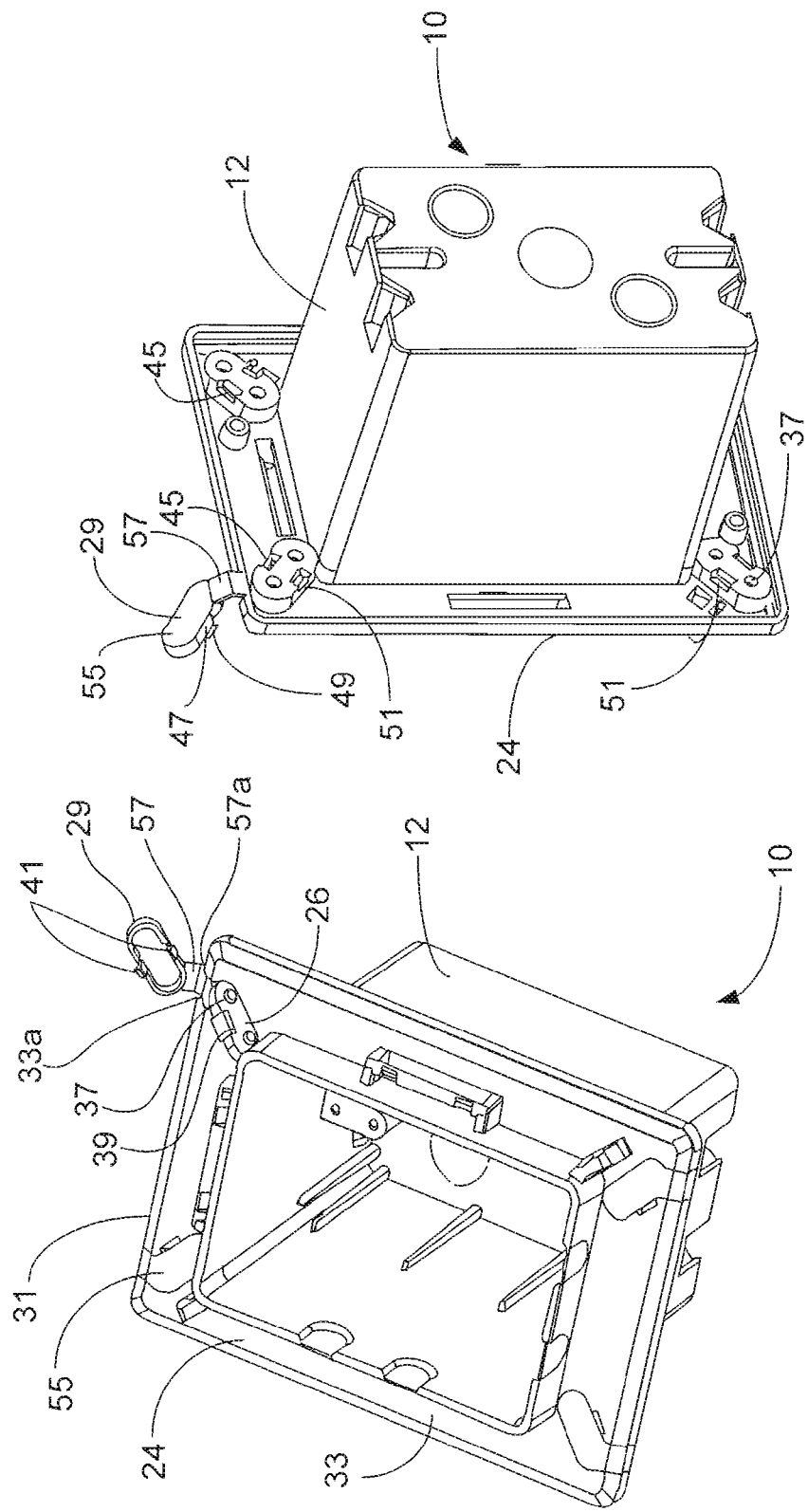
FIG. 7 is a front perspective view of a while in use recessed electrical box having an integral hinged snap fit screw plug.
FIG. 8 is a rear perspective view of a while in use recessed electrical box having an integral hinged snap fit screw plug.

Referring to the drawings, there is shown recessed electrical outlet box 10 consisting of a body portion 12 and a cover portion 14. Cover portion 14 may be pivotally secured to body portion 12 via hinge 16 which can be provided either on its narrower edge 16 or its wider edge 17 depending on the cover pivoting preference. On one corner of cover 14 is a tab mechanism 15, which can be used to releasably retain cover 14 in the closed position. Hinge 16 and tab mechanism 15 may be of typical construction and are preferably molded at the same time as body 12. Cover 14 is generally separately constructed and added to body 12 during assembly. Hence, hinge 16 can be designed to allow cover 14 to be assembled with the body 12 during the final stages of manufacturing.

Box 10 is generally constructed of a plastic material but this need not necessarily be the case. Body 12 and cover 14 may also be made of the same material or they may be made of different materials. Furthermore, cover 14 may be opaque, transparent or translucent if desired. As shown, the exterior of box 10 is rectangular but portions of it as well as the interior 20 of body 12 could be round, square, octagon or some other shape if desired.

Generally, flange 24 surrounds the front end 22 of body 12 and extends radially outward from body 12. Flange 24 serves to not only aid in covering the opening made in the wall structure (not shown) into which body 12 is placed, but flange 24 also serves to support cover 14 therefrom via hinge 16. Latching mechanism 18 is also supported from flange 24 in the normal fashion. Flange 24 may also be configured with one or more mounting openings 26 therein through which a fastener will pass in order to secure body 12, and hence box 10, to a building structure. In the view shown in FIG. 1, mounting openings 26 are covered with screw plugs 29.

The interior 20 of body 12 may be configured with multiple pairs of bosses therein. Boss pair 28 project into interior 20. Each end region 32 of each boss of each boss pair 28 can be configured with at least one mounting hole 34 therein. Preferably each boss would be configured with at least a mounting hole 34 and a cover plate mounting hole 36 in end region 32.

Mounting hole 34 can be sized and shaped to accept a mounting screw used to secure an electrical fixture (not shown) to body 12. Such electrical fixtures include, but are not limited to, a duplex, GFCI, switch, data jack, co-axial cable connector or the like. Mounting hole 34 would either be pre-threaded so as to accept the mounting screw therein or mounting hole 34 would become threaded upon the rotation of the mounting screw therein. In contrast, cover plate mounting hole 36 can be generally sized larger and is preferably also threaded to accept a cover plate mounting screw for attaching a cover plate to cover an electrical component. Cover plate mounting hole 36 preferably provides a place for the screw that secures the cover plate (not shown) to the fixture to extend. Hence, while mounting hole 34 is employed to secure the fixture to body 12, cover plate mounting hole 36 can be employed to accept a cover plate mounting screw for securing the cover plate to the fixture.

In this embodiment, the bosses 28 are preferably located within interior 20 in accordance with industry guidelines that set forth the requirements for single gang boxes. However, while a single gang electrical box is depicted in accordance with the present invention, one skilled in the art will recognize that a larger box, such as a double gang box may be developed within the scope of the present invention. Center boss pair 28 can be located in accordance with the requirements for a single gang box while an adjacent pair of bosses may be located in accordance with the requirements for a double gang box. Hence, in accordance with the present invention, a recessed box 10 may be used whether there is a need for a single or a double gang box. While boss pairs 28 are shown extending continuously upward from the back of body 12, other configurations of boss pairs 28 are equally likely, such as extending only intermediate the front and back surfaces of body 12 or incorporating only a single boss pair but with multiple mounting holes 34 therein.

In addition to the above capabilities, the electrical box of the present invention incorporates an elliptically shaped recess 26 on box flange 24 for receiving mounting screws 30 for attaching electrical box 10 to a structure. As will be described in further detail hereinbelow, the recess 26 receives a snap fit plug 29 which forms a cover for the recess 26. Typically, box flange 24 includes a mounting screw recess 26 at each corner. The screw recess 26 may be of a wide variety of shapes, sizes and configurations. In the presently described embodiments, the screw recess 26 are oval-shaped and aligned at approximately a 45 degree angle to the flange 24 side edges 31 as shown. In other embodiments, the screw recess 26 can be aligned parallel to either side of the box flange edge or alternately at some other angle as may be needed in accordance with any particular use for the recessed electrical box 10. It can further be appreciated that the flange 24 includes an overhang with a thickness that corresponds to the depth of the recess 26.

As shown in FIG. 4, each recess 26 is formed as a depression in the flange surface 33. The bottom surface 35 of recess 26 includes holes 37 for mounting screws 30. In the embodiment depicted there are shown two mounting holes 37. However, an alternate number of mounting holes could be utilized within the scope and spirit of the present invention. In addition, there are located on the side wall 26a of recess 26 slots 39 for receiving resilient snap fit device 41 of screw plugs 29 (FIGS. 5 and 6). The slots 39 include a niche 45 defining an opening in bottom surface 35 of recess 26. The niche 45 provides clearance for receiving the tang 49 of resilient snap fit device 41 formed as a deformable thermoplastic as shown in FIGS. 5 and 6. In addition, niche 45 can also be designed so that the blade of a regular flat blade screwdriver may be inserted into recess 26 from the rear (FIGS. 9 and 10) to remove screw plug 29 if necessary. The tang 49 can be integrally formed with and attached to a cantilevered resilient stanchion 47 on the bottom side of snap fit screw plug 29.

Referring additionally to FIGS. 5 and 6, snap fit plug 29 includes a pair of opposed resilient snap fit devices 41 extending from either side thereof. The snap fit devices 41 are received by slots 39 in recess 26. When screw plug 29 is inserted into recess 26, the tangs 49 engage the side wall 26a, causing resilient stanchions 47 to flex inward. Once the screw plug 29 is fully inserted into recess 26, tangs 49 are received by the opening defined by niche 45 whereupon the inward pressure on resilient stanchions 47 is released causing tangs 49 to engage the inside edges 51 of niche 45, thereby retaining screw plug 29 within recess 26.

Snap fit screw plug 29 further includes a perimetrical side wall 50 which forms a recessed area 50a accommodating the heads of mounting screws 30 (not shown) when a snap fit screw plug 29 is fully inserted within recess 26. In this way the top surface 55 of snap fit screw plug 29 will align flush with flange surface 33 when it is fully inserted within recess 26 to define a flat plane with the flange 24. Thus, the plug 29 covers completely over the recess 26 in a seamless arrangement. Furthermore, it should be noted that the outer dimension of perimetrical side wall 50 is adapted to provide a close tolerance fit with the inner dimension of recess 26.

In addition to the embodiment disclosed above, an alternate embodiment is depicted in FIGS. 7 and 8. Shown in FIGS. 7 and 8 is snap fit screw plug 29 attached or tethered to flange outer side edge 31 with a living hinge 57. As shown in FIG. 7 the living hinge 57 when in the open position, extends the snap fit screw plug 29 beyond flange side edge 31 such that mounting screws 30 (not shown) may be installed into mounting holes 37 to rigidly affix electrical box 10 to a structure. Once the mounting screws 30 are fully in place, the snap fit screw plug 29 can be snapped into place by rotating the plug 29 on the hinge 57 about its axis such that snap fit device 41 engages slots 39 in recess 26 as described above. As is further seen in FIG. 7, when the snap fit screw plugs 29 are closed, the top surface 55 of snap fit screw plugs 29 are flush with flange top surface 33. In that regard, the perimetrical edge 33a of flange surface 33 includes grooves 57a for accommodating living hinge 57. Each of the grooves 57a support the living hinge 57 in a flush condition when the snap fit screw plugs 29 are inserted into recess 26.

Also shown in FIG. 8 is the rear view of the electrical box 10 wherein the rear of recess 26 is visible. In this view the rear of mounting screw holes 37 are visible as well as opening 45. More particularly, there is shown the inside edge 51 of openings 45. As described above, when snap fit screw plugs 29 are fully inserted, inward pressure on resilient stanchions 47 is released as tangs 49 pass through openings 45 causing resilient stanchions to flex back into their pre loaded position, whereupon tangs 49 engage the inside edge 51 of opening 45, thereby retaining screw plug 29 within recess 26.

In addition to the above capabilities, FIGS. 9 and 10 depict the electrical box according to the present invention showing both an exploded view of the box and duplex electrical outlet with adapter plate and a view of the electrical box and installed electrical components. In FIG. 9 a front perspective view of electrical box 10 is shown along with a duplex electrical outlet 90, an adapter plate 92 and a cover plate 94. If the receptacle is a GFCI unit, then in this embodiment a cover plate is mounted directly over the GFCI unit without the need for a separate adapter plate 92. Also shown are outlet mounting screws 96 which are received into mounting hole 34 on boss 28 and plate mounting screws 98 which are received into cover plate mounting holes 36 on boss 28. Once installed electrical outlet 90 is housed within electrical box 10 as depicted in FIG. 10 wherein cover plate 94 is shown in position over duplex outlet 90 within the interior 20 of recessed electrical box 10.

While select preferred embodiments of this invention have been illustrated, many modifications may occur to those skilled in the art and therefore it is to be understood that these modifications are incorporated within these embodiments as fully as if they were fully illustrated and described herein.

What is claimed is:

1. A recessed electrical outlet box comprising:
a body having a back surface, an open front surface and a perimeter surface therebetween defining a box interior; an outwardly extending flange formed around said perimeter surface; a plurality of recesses provided on said outwardly extending flange, each of said plurality of recesses adapted to receive at least one mounting screw; and a plug for covering each of said plurality of recesses; wherein said plug includes a side wall having a resilient tang for releasably securing said plug in one of said plurality of recesses; and one of said plurality of recesses includes a recess side wall including an opening therethrough for releasably receiving said resilient tang of said plug.

2. The recessed electrical outlet box of claim 1, wherein said plug includes a generally planar surface [and a depending plug side wall extending therefrom], said plug side wall being received in one of said plurality of recesses [said recess] for placing said planar surface of said plug in flush relatively with said flange.

3. The recessed electrical outlet box of claim 1, wherein said plug is attached to said flange by a tether.

4. The recessed electrical outlet box of claim 3, wherein said flange, said plug and said tether are integrally formed.

5. The recessed electrical outlet box of claim 3, wherein said flange includes a groove adjacent said tether for accommodating said tether when said plug in inserted into one of said plurality of recesses.

6. The recessed electrical outlet box of claim 3, wherein one of said plurality of recesses includes a bottom surface and a screw aperture therethrough for accommodating said mounting screw.

7. The recessed electrical outlet box of claim 1, wherein a plurality of bosses are situated within said box interior, each of said bosses having at least one mounting hole for mounting at least one electrical fixture.

8. An electrical outlet box for supporting an electrical fixture comprising: a box housing having a back wall, a perimetrgal side wall, an open front face and a generally planar flange surrounding said open front face for supporting said box to a wall surface; said flange including a mounting aperture therethrough having a recess for releasably receiving a fastening hardware therewith for securing said flange to said wall surface; and a cover for overlying said mounting aperture and said inserted fastening hardware; said cover having a surface therewith in flush relationship with said planar flange; wherein said cover includes a plug, said plug having a planar surface and depending resilient tang for releasably resiliently securing said tang in said recess; and wherein said flange includes a tether for attaching said plug to said flange.

9. An electrical outlet box of claim 8, wherein said cover is insertable into said recess.

10. An electrical outlet box of claim 8, wherein said cover is releasably insertable into said recess.

11. An electrical outlet box of claim 10, wherein said planar surface is flush with said flange, wherein said tang is inserted into said recess.

12. An electrical outlet box of claim 10, wherein said recess includes a side wall and when said side wall includes an opening for releasably receiving said tang.

13. An electrical outlet box of claim 10, wherein said plug, said tether and said flange are integrally formed.

14. An electrical outlet box of claim 10, wherein said flange includes a channel for receipt of said tether.

* * * * *

UNITED STATES PATENT AND TRADEMARK OFFICE
CERTIFICATE OF CORRECTION

PATENT NO. : 7,501,575 B2 Page 1 of 1
APPLICATION NO. : 11/893931
DATED : March 10, 2009
INVENTOR(S) : Robert K. Jolly It is certified that error appears in the above-identified patent and that said Letters Patent is hereby corrected as shown below:

At column 5, claim 2, lines 35-36, the printed patent incorrectly reads "...surface [and a depending plug wall extending therefrom], said plug..."; the patent should read --...surface, said plug...--.

At column 5, claim 2, lines 37-38, the printed patent incorrectly reads "...recesses [said recess] for placing..."; the patent should read --...recesses for placing...--.

At column 5, claim 5, line 36, the printed patent incorrectly reads "...said plug in inserted..."; the patent should read --...said plug is inserted...--.

At column 6, claim 8, line 11, the printed patent incorrectly reads "...perimetrgal side wall..."; the patent should read --...perimetrical side wall...--.

Signed and Sealed this

Twelfth Day of May, 2009

JOHN DOLL
*Acting Director of the United States Patent and Trademark Office*